(12) United States Patent
Galvin, Jr. et al.

(10) Patent No.: US 10,423,931 B2
(45) Date of Patent: Sep. 24, 2019

(54) DYNAMIC PROCESSING FOR COLLABORATIVE EVENTS

(71) Applicant: International Business Machines Corporation, Armonk, NY (US)

(72) Inventors: James P. Galvin, Jr., Georgetown, KY (US); Amy D. Travis, Arlington, MA (US); Sara B. Weber, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 632 days.

(21) Appl. No.: 14/985,602

(22) Filed: Dec. 31, 2015

(65) Prior Publication Data

US 2017/0193455 A1    Jul. 6, 2017

(51) Int. Cl.
*G06Q 10/10* (2012.01)
*G06F 16/245* (2019.01)
*G06F 16/2457* (2019.01)

(52) U.S. Cl.
CPC ........ *G06Q 10/1095* (2013.01); *G06F 16/245* (2019.01); *G06F 16/24578* (2019.01)

(58) Field of Classification Search
CPC .......... G06Q 10/1095; G06Q 10/1093; G06Q 10/103; G06Q 10/06312; G06Q 10/063114; G06Q 10/063118; G06Q 10/101; G06F 17/30424; G06F 17/3053; G06T 2219/024

See application file for complete search history.

(56) References Cited

U.S. PATENT DOCUMENTS

| | | | | |
|---|---|---|---|---|
| 8,626,550 | B2* | 1/2014 | Marston | G06Q 10/109 |
| | | | | 705/7.16 |
| 9,647,920 | B2* | 5/2017 | Garrick | H04L 43/10 |
| 9,754,243 | B2* | 9/2017 | Goldsmith | G06Q 10/06 |
| 2003/0069859 | A1* | 4/2003 | Hoffman | G06Q 10/06 |
| | | | | 705/400 |
| 2005/0240602 | A1* | 10/2005 | Bodin | G06Q 10/10 |
| 2006/0068812 | A1* | 3/2006 | Carro | H04M 1/72566 |
| | | | | 455/456.3 |
| 2008/0086455 | A1* | 4/2008 | Meisels | G01C 21/26 |
| 2008/0306826 | A1* | 12/2008 | Kramer | G06Q 30/02 |
| | | | | 705/14.14 |
| 2009/0100037 | A1* | 4/2009 | Scheibe | G06F 16/9537 |
| 2010/0076351 | A1* | 3/2010 | Jiang | A61B 5/055 |
| | | | | 601/2 |
| 2010/0076951 | A1* | 3/2010 | Lyle | H04W 4/21 |
| | | | | 707/706 |

(Continued)

OTHER PUBLICATIONS

IBM.com/redbooks, VSAM Demystified, ISBN 0738437433, Mar. 2013, 458 pages.

*Primary Examiner* — Tyler W Knox
(74) *Attorney, Agent, or Firm* — Cantor Colburn LLP; David Zwick

(57) ABSTRACT

Embodiments include method, systems and computer program products for dynamic processing for collaborative events. In some embodiments, first data associated with a collaborative event may be received. Second data from one or more sensors of a user device may be received. The first data and the second data may be analyzed. An action recommendation may be generated based on the analyzed first data and the analyzed second data. The action recommendation may be transmitted.

20 Claims, 3 Drawing Sheets

(56) References Cited

U.S. PATENT DOCUMENTS

| | | | |
|---|---|---|---|
| 2010/0179753 A1* | 7/2010 | Agarwal | G01C 21/20 701/465 |
| 2010/0211425 A1* | 8/2010 | Govindarajan | G01C 21/34 705/7.16 |
| 2010/0274855 A1* | 10/2010 | Wassingbo | G06Q 10/109 709/206 |
| 2011/0113148 A1* | 5/2011 | Salmela | G01C 21/3438 709/229 |
| 2011/0173263 A1* | 7/2011 | Beers | H04L 12/1822 709/204 |
| 2012/0215845 A1* | 8/2012 | Aad | G06Q 10/1093 709/204 |
| 2012/0226536 A1* | 9/2012 | Kidron | G06F 15/167 705/14.23 |
| 2013/0226646 A1* | 8/2013 | Watkins | G06Q 10/1095 705/7.19 |
| 2013/0282421 A1* | 10/2013 | Graff | G06Q 10/1093 705/7.18 |
| 2013/0332067 A1* | 12/2013 | Schlesinger | G01C 21/3438 701/422 |
| 2013/0346545 A1* | 12/2013 | Petersen | H04L 67/10 709/217 |
| 2014/0096266 A1* | 4/2014 | Hoard | H04L 63/0428 726/28 |
| 2014/0129239 A1* | 5/2014 | Utter, II | G06Q 50/22 705/2 |
| 2014/0164531 A1* | 6/2014 | Bastide | H04L 65/403 709/206 |
| 2014/0187213 A1* | 7/2014 | Shuster | H04W 4/023 455/414.1 |
| 2014/0188541 A1* | 7/2014 | Goldsmith | G06Q 10/06 705/7.19 |
| 2014/0229099 A1* | 8/2014 | Garrett | G06Q 10/06311 701/465 |
| 2014/0244332 A1* | 8/2014 | Mermelstein | G06Q 10/1093 705/7.16 |
| 2014/0278086 A1* | 9/2014 | San Filippo | G01C 21/3423 701/527 |
| 2014/0314215 A1* | 10/2014 | Duva | G06Q 30/0202 379/88.01 |
| 2015/0045068 A1* | 2/2015 | Soffer | H04W 4/025 455/456.3 |
| 2015/0071427 A1* | 3/2015 | Kelley | G06Q 30/0202 379/265.09 |
| 2015/0200981 A1* | 7/2015 | Garrick | H04L 43/10 709/204 |
| 2015/0254748 A1* | 9/2015 | Gao | G06Q 30/0605 705/26.44 |
| 2015/0324751 A1* | 11/2015 | Orenstein | G06F 19/3481 702/3 |
| 2015/0363748 A1* | 12/2015 | Beaurepaire | G06Q 10/1095 705/7.19 |
| 2015/0379562 A1* | 12/2015 | Spievak | H04M 3/5158 379/265.09 |
| 2016/0012465 A1* | 1/2016 | Sharp | G06Q 20/18 705/14.17 |
| 2016/0091330 A1* | 3/2016 | Wicker | G01C 21/3415 701/410 |
| 2016/0203502 A1* | 7/2016 | Boinodiris | G06Q 30/0205 705/7.34 |
| 2016/0232137 A1* | 8/2016 | Liu | G06F 17/2235 |
| 2016/0232201 A1* | 8/2016 | Goran | G06F 16/24 |
| 2016/0232244 A1* | 8/2016 | Liu | G06F 16/9535 |
| 2016/0234184 A1* | 8/2016 | Liu | G06F 16/24 |
| 2016/0234595 A1* | 8/2016 | Goran | H04R 3/002 |
| 2016/0290816 A1* | 10/2016 | Bauer | G01C 21/3438 |
| 2016/0358065 A1* | 12/2016 | Gedge | G06N 3/006 |
| 2016/0364823 A1* | 12/2016 | Cao | G06Q 50/30 |
| 2017/0039527 A1* | 2/2017 | Rangan | G06Q 10/1095 |
| 2017/0091713 A1* | 3/2017 | Paris | G06Q 10/1093 |
| 2018/0032997 A1* | 2/2018 | Gordon | G06Q 20/3224 |

* cited by examiner

DYNAMIC PROCESSING FOR COLLABORATIVE EVENTS

BACKGROUND

The present disclosure relates to data analysis, and more specifically, to methods, systems and computer program products for dynamic data processing for collaborative events.

Advancements in technology allow people to remain connected to a network without necessarily having to remain in an office. Additionally, mobile devices, such as smartphones and tablets, may be used to navigate routes while traveling. In many situations, users may obtain information about a collaborative event, such as a meeting, while traveling and may use the information to navigate to the collaborative event. However, simply trying to navigate to the collaborative event may not be the optimal action in certain circumstances.

SUMMARY

In accordance with an embodiment, a method for dynamic processing of collaborative events is provided. The method may include retrieving first data associated with a collaborative event; receiving second data from one or more sensors of a user device; analyzing the first data and second data; generating an action recommendation based on the analyzed first data and the analyzed second data; and transmitting the action recommendation.

In another embodiment, a computer program product may comprise a non-transitory storage medium readable by a processing circuit and storing instructions for execution by the processing circuit for performing a method that may include retrieving first data associated with a collaborative event; receiving second data from one or more sensors of a user device; analyzing the first data and second data; generating an action recommendation based on the analyzed first data and the analyzed second data; and transmitting the action recommendation.

In another embodiment, a system for optimizing persistency using hybrid memory may include a processor in communication with one or more types of memory. The processor may be configured to retrieve first data associated with a collaborative event; receive second data from one or more sensors of a user device; analyze the first data and second data; generate an action recommendation based on the analyzed first data and the analyzed second data; and transmit the action recommendation.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

Figure 1:
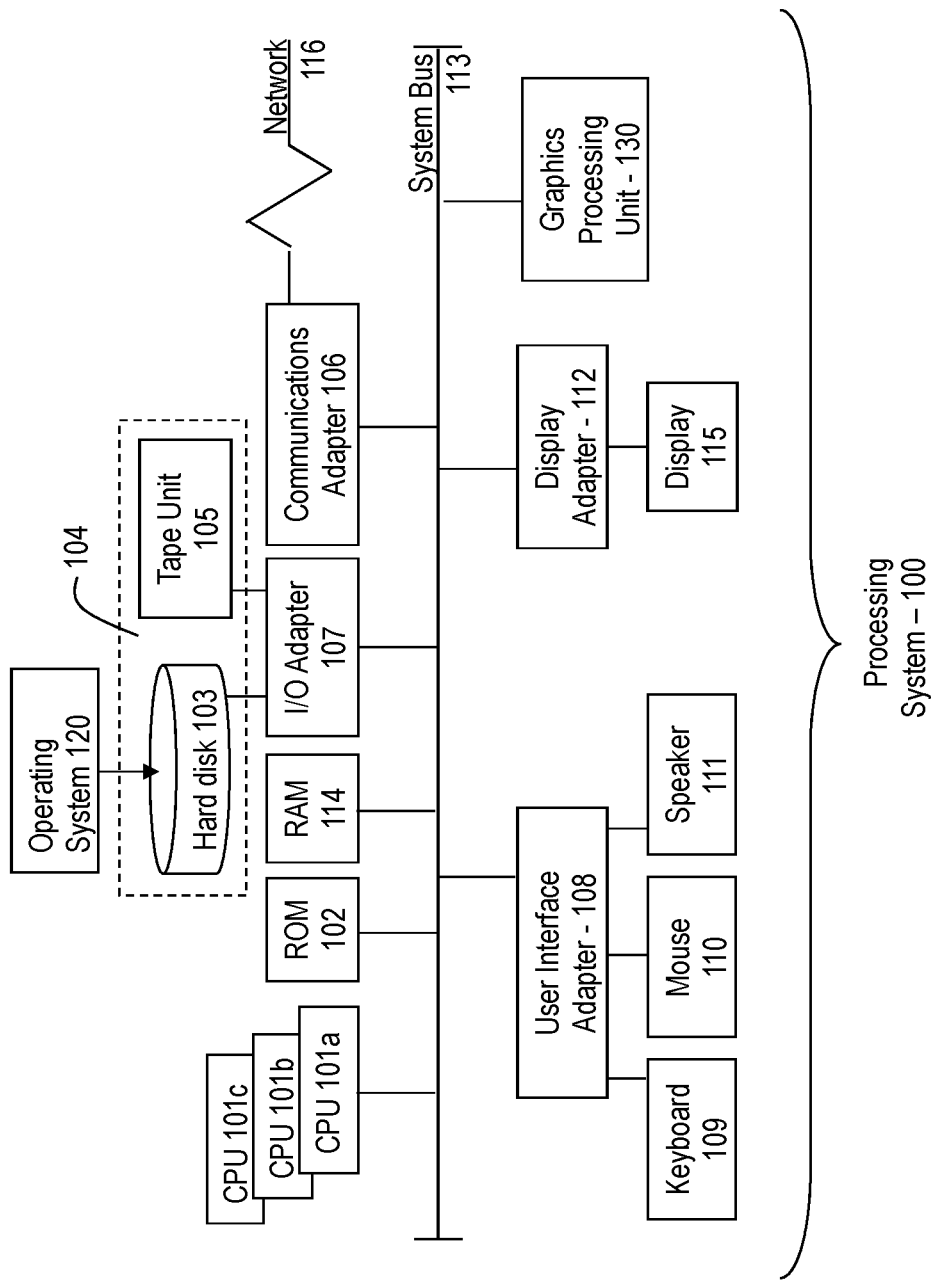
FIG. 1 is a block diagram illustrating one example of a processing system for practice of the teachings herein.

In accordance with exemplary embodiments of the disclosure, methods, systems and computer program products for dynamic processing of collaborative events are provided. For the purposes of this disclosure, the terms 'meeting' and 'collaborative event' may be used interchangeably. The methods and systems described herein are directed to obtain information about the collaborative event as well as the current status of the user and process the information to generate one or more optimal action recommendations for the circumstances. Examples of details associated with a collaborative event may include the location of the collaborative event, the type of media that may be involved (e.g., tools for video and data sharing), meeting attendees and their respective roles (e.g., presenter, contributor, etc.), and the like. Examples of user information may include current status location, network availability (e.g., to determine whether the user can join using an alternative mode), and/or proximity to available networks, rooms, or the like.

The system and methods described herein are directed to obtaining information associated with the collaborative event and the user and may analyze the information. One or more optimal action recommendations may be generated, where each recommendation provides information to guide the user to the best possible collaboration experience based on the specific circumstances. For example, if it is determined that there is sufficient time for the user to travel to the location of the collaborative event, the system may provide directions to the location. If the user is close and the meeting is not urgent, the system may notify other attendees that the user will be late. If the user does not have sufficient time to travel to the location, a recommended action may suggest an alternate location with sufficient privacy and network bandwidth to accommodate the tools to be used (i.e. a mobility cube, Internet cafe, etc.).

The systems and methods described herein may take into account multiple factors to generate one or more action recommendations. Examples of such factors may include, but are not limited to, location of the collaborative event; number of attendees at the one or more locations associated with the collaborative event; location of the attendee who is requesting action recommendations, role of the attendees present at the location and/or traveling to the location, number of attendees using alternative meeting tools (e.g., phone, video conference, etc.), interaction methods associated with the collaborative event (e.g., video conference, data sharing, etc.), interaction capabilities of devices utilized by attendees who are not physically present at the meeting location, threshold for tardiness depending on type of meeting, and/or previous behavior (e.g., use of coffee shops as an alternative location to connect to a network to virtually attend the collaborative event).

The systems and methods described herein use analytics of a variety of information about the user, the environment, and the collaboration event in which the user plans to participate to determine action recommendations for an optimal collaborative experience. For example, knowing how far the user is from the event may determine whether they can attend locally or remotely; knowing who is in the meeting may help to determine whether it is better to be on time but remote or late but physically present at the meeting; knowing the user's role in the meeting may help determine whether or not other attendees need to be informed about the user's status; knowing what tools and materials will be used in the meeting may help determine the valid options for successful collaboration; knowing the user's environment may be important in providing alternatives the user might not otherwise consider; knowing the topic of the meeting may help determine privacy requirements; and knowing how the user has behaved in similar past situations may guide the overall recommendation process.

The ultimate action taken will be determined by the user, but the user may be empowered to make better-informed decisions knowing the different options that are available to the user.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via a user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
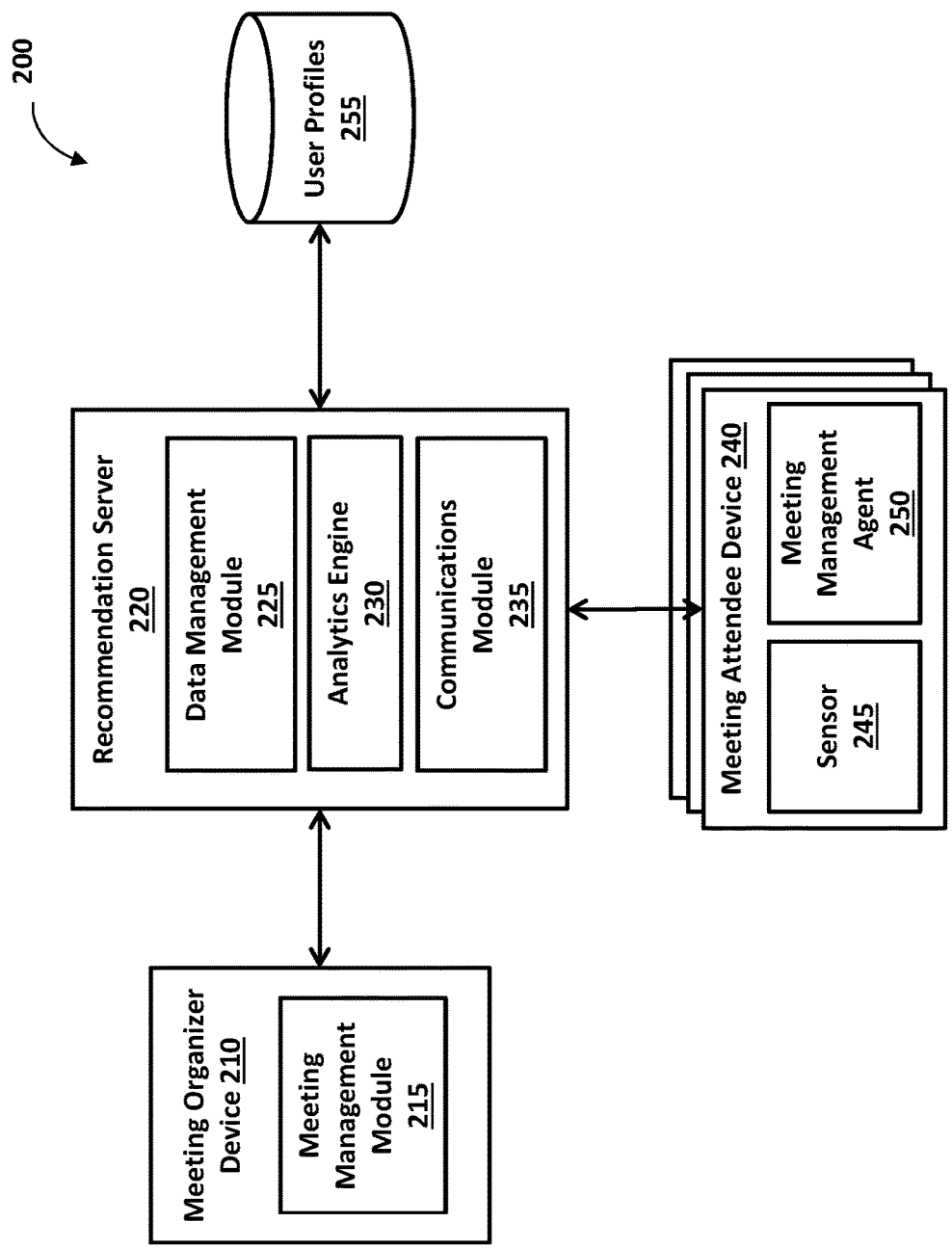
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a meeting organizer device 210, a recommendation server 220, one or more meeting attendee device(s) 240, and/or user profiles data store 255.

In some embodiments, the meeting organizer device 210 may be any type of user device, which may include smartphones, tablets, laptops, desktop, server, and the like. A meeting organizer device 210 may include a meeting management module 215. The meeting management module 215 may include computer-readable instructions that in response to execution by the processor(s) 101 cause operations to be performed including receiving information from a user, such as details associated with a meeting. Examples of such information may include date and time of the meeting, location of the meeting, tools to be used during the meeting (e.g., audio/video equipment, video conferencing, etc.), designation of meeting attendees, materials to be distributed at the meeting (e.g., documents, presentations, etc.), and the like. The meeting management module 215 may receive data associated with the meeting from the user and may transmit the data to a recommendation server 220.

In some embodiments, the recommendation server 220 may be any type of computing device, which may include desktop, server, and the like. In some embodiments, the recommendation server 220 may include a data management module 225, and analytics engine 230, and/or a communications module 235. The data management module 225 may include computer-readable instructions that in response to execution by the processor(s) 101 cause operations to be performed including receiving meeting data and obtaining contextual data from one or more sources, such as a meeting attendee device 240 and/or data store (e.g., user profiles data store 255). The data management module 225 may receive contextual data from the meeting attendee device 240, such as a current location of the device 240 and its proximity to resources (e.g., conference room, network, etc.). The data management module 225 may obtain a user profile associated with the user of the meeting attendee device 240 from the user profiles data store 255. The data management module 225 may transmit the data to the analytics engine 230.

The analytics engine 230 may include computer-readable instructions that in response to execution by the processor(s) 101 cause operations to be performed including receiving data from the data management module 225 and analyzing the received data. The analytics engine 230 may generate one or more action recommendations using the analyzed data. The analytics engines 230 may transmit the one or more actions to the communications module 235.

The communications module 235 may include computer-readable instructions that in response to execution by the processor(s) 101 cause operations to be performed including receive the one or more generated options form the analytics engines 230. In some embodiments, the communications module 235 may transmit a notification to the meeting attendee device 240 with the action recommendations. In some embodiments, the communications module 235 may transmit a notification to one or more attendees associated with the meeting. The notification may include a message indicative of any updates to the meeting. In some embodiments, the communications module 235 may transmit an update notification to the attendees of the meeting based on the action recommendation selected by the user.

In some embodiments, meeting attendee device 240 may maybe any type of user device, which may include smartphones, tablets, laptops, desktop, server, and the like. A meeting attendee device 240 may include a meeting management agent 250. The meeting management agent 250 include computer-readable instructions that in response to execution by the processor(s) 101 cause operations to be performed including obtaining data from one or more sensors 245 of the meeting attendee device 240. Examples of sensors may include but are not limited to a GPS sensor and/or a network antenna (e.g., to detect available networks within the vicinity). The meeting management agent 250 may transmit data (e.g., contextual environmental data) to the recommendation server 220 and may receive one or more action recommendations. The meeting management agent 250 may transmit an indication of a selection or confirmation of the action recommendation to the recommendation server 220.

Figure 3:
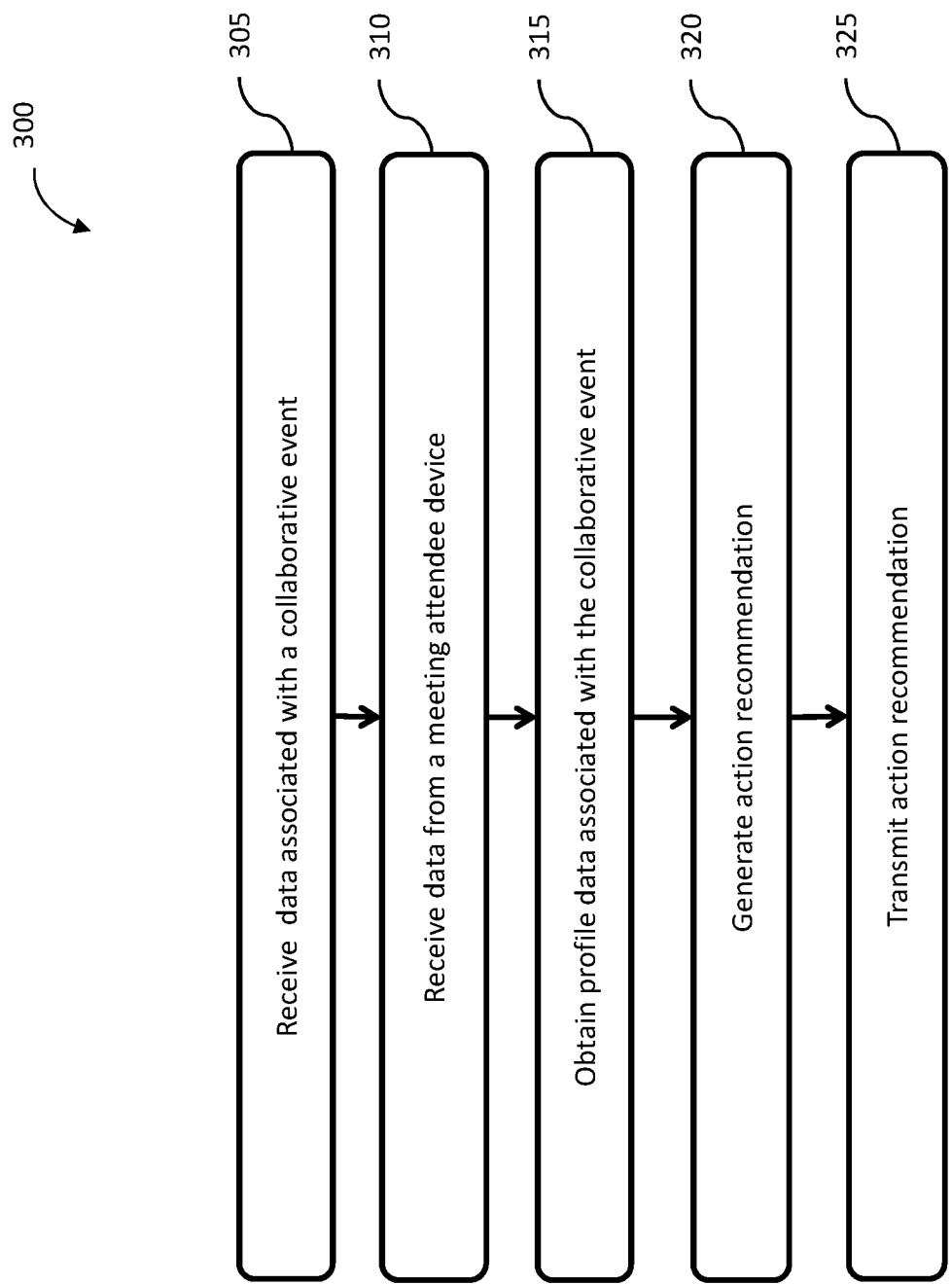
FIG. 3 is a flow diagram of a method for dynamic processing for collaborative events in accordance with an exemplary embodiment.

Now referring to FIG. 3, is a flow diagram of a method 300 for dynamic processing for collaborative events in accordance with an exemplary embodiment is shown. At block 305, the data management module 225 may receive data associated with a collaborative event. In some embodiments, the data may have been obtained from a user by a meeting management module 215 of a meeting organizer device 210. The meeting management module 215 may have facilitated presentation of an interface (e.g., client application, web interface, etc.) to the user and the user may have provided data associated with the collaborative event, such as date, time, duration, location, tools required, presentation materials, required and optional attendees, alternative mechanisms to join the event (e.g., phone conference, video conference, etc.), and the like.

At block 310, the data management module 225 may receive data from one or more meeting attendee device(s) 240. In some embodiments, data from one or more meeting attendee device(s) 240 may be received from a meeting management agent 250 executing on the meeting attendee device 240. In some embodiments, the data may be environmental contextual data associated with a device, such as traffic conditions in relation to the meeting attendee device 240, weather conditions proximate to the meeting attendee device 240, or the like. The meeting management agent 250 may obtain data from one or more sensors 245 associated with the meeting attendee device 240. Examples of the sensors 245 may include, but are not limited to a GPS sensor (e.g., indicating current location of the meeting attendee device 240), antenna (e.g., detect nearby networks), and the like. The meeting management agent 250 may obtain the information from the sensors 245 and may transmit the data to the data management module 225 of the recommendation server 220.

At block 315, the data management module 225 may receive profile data associated with the collaborative event. In some embodiments, the data management module 225 may obtain user profiles from the user profiles data store 255 for each attendee associated with the collaborative event. In some embodiments, the data management module 225 may obtain a user profile from the user profiles data store 225 for user of the meeting attendee device 240. The user profile for each attendee may include information about the preferences of a user (e.g., does not like to take meetings in an open area, such as a coffee shop) as well as past behavior (e.g., in previous meetings, the user has preferred to utilize an available conference room and using their laptop to join the collaborative event.) The data management module 225 may transmit the collected data to the analytics engine 230.

In some embodiments, the data management module 225 may obtain additional information based on the data associated with the collaborative event. For example, the data management module 225 may obtain availability of conference rooms between the current location of a user of the meeting attendee device 240 and the meeting location. In some embodiments, the data management module 225 may obtain available networks and credentials for networks that may be available to the user to utilize to join the collaborative event.

At block 320, the analytics engine 230 may generate one or more action recommendations. The analytics engine 230 may receive data from the data management module 225 and may analyze the data collected (e.g., data associated with the collaborative event, data obtained from the meeting attendee device(s) 240, and/or user profile(s) obtained from the user profiles data store 255). In some embodiments, the action recommendation may include the fastest route to the collaborative event; a location with network access where the user may join the collaborative event either by phone conference, video conference, or the like; or updating the collaborative event with a new date and/or a new time and transmitting an update notification to each meeting attendee associated with the collaborative event.

In some embodiments, the analytics engine 230 may generate weighted factors using data associated with the collaborative event and analyze the data obtained from the meeting attendee device 240 and/or user profiles using the weighted factors.

In some embodiments, the analytics engine 230 may receive updated data from the meeting attendee device 240 (e.g., updated location, update traffic conditions, etc.), which the data management module 225 may process and transmit to the analytics engine 230 for further processing. The analytics engine 230 may update or generated a second action recommendation based on the updated data received from the meeting attendee device 240.

At block 325, the communications module 235 may transmit the action recommendation(s). The communications module 235 may receive the one or more action recommendations from the analytics engine 230. In some embodiments, the communications module 235 may transmit a notification to the meeting attendee device 240 with the action recommendations. In some embodiments, the communications module 235 may transmit a notification to one or more attendees associated with the meeting. The notification may include a message indicative of any updates to the meeting. In some embodiments, the communications module 235 may transmit an update notification to the attendees of the meeting based on the action recommendation selected by the user.

In some embodiments, the user of a meeting attendee device 240 may select one of the presented action recommendations using the meeting attendee device 240. The meeting management agent 250 may transmit an indication corresponding to the selection. If there are additional steps that need to be taken, the communications module 235 may facilitate completion of those steps (e.g., obtaining network credentials for a requested network, reserving a conference room for the user to use, notifying other meeting attendees of any delay, etc.). In some embodiments, the communications module 235 may transmit the indication of the selection to the data management module 225. The data management module 225 may update the user profile using the selection action recommendation and may transmit the updated profile to the user profiles data store 255.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
receiving first data associated with a collaborative event, the first data comprising data indicative of a location of the collaborative event, data indicative of a start time of the collaborative event, and data indicative of respective roles of one or more participants in the collaborative event;

receiving second data from one or more sensors of a user device, the second data comprising data indicative of a current location of the user device and data indicative of network connectivity of the user device;

analyzing the first data and second data, wherein analyzing comprises:

determining, based at least in part on the location of the collaborative event, the start time of the collaborative event, and the current location of the user device, that an estimated arrival time of a user of the user device to the collaborative event is after the start time;

determining, based at least in part on the second data, a proximity of the user device to available networks, wherein the second data comprises network proximity data captured by a network antenna of the user device;

determining interaction capabilities of devices present at the collaborative event;

determining interaction capabilities of the user device;

determining, based at least in part on the proximity of the user device to available networks, the interaction capabilities of the user device, and the interaction capabilities of devices present at the collaborative event, that the network connectivity of the user device can support a remote connection of the user device to at least one device present at the collaborative event; and determining, based at least in part on a comparison of the respective roles of the one or more participants in the collaborative event to an expected role of the user in the collaborative event and an assessment of historical data indicating whether the user was physically present at prior collaborative events or remotely connected to the prior collaborative events, whether to generate a first recommendation that the user physically arrive at the location of the collaborative event after the start time or generate a second recommendation for the user device to connect remotely to the device present at the collaborative event at or prior to the start time;

generating an action recommendation based at least in part on the analyzed first data and the analyzed second data, wherein the action recommendation comprises the first recommendation or the second recommendation; and transmitting the action recommendation.

2. The computer-implemented method of claim 1, wherein the action recommendation comprises the first recommendation and further comprises a route to the collaborative event.

3. The computer-implemented method of claim 1, wherein the action recommendation comprises the first recommendation, the method further comprising:

determining an available network in proximity to the user device;

obtaining network credentials for the available network;

determining a location from which the available network is accessible; and sending an indication of the location and the network credentials to the user device.

4. The computer-implemented method of claim 1, wherein the action recommendation comprises:

updating the collaborative event with a new date, a new time, or both; and transmitting an update notification to each meeting attendee associated with the collaborative event.

5. The computer-implemented method of claim 1, wherein analyzing the first data and second data further comprises:

generating weighted factors using the first data; and analyzing the second data using the weighted factors.

6. The computer-implemented method of claim 1, further comprising:

receiving a user profile for each attendee associated with the collaborative event;

analyzing the user profile for each attendee; and generating the action recommendation based on the analyzed first data, the analyzed second data, and the analyzed user profile for each attendee.

7. The computer-implemented method of claim 1, wherein the action recommendation is a first action recommendation, the method further comprising:

receiving updated second data from the one or more sensors of the user device;

analyzing the first data and updated second data;

generating a second action recommendation based on the analyzed first data and the analyzed updated second data; and transmitting the second action recommendation.

8. A computer program product comprising a non-transitory storage medium readable by a processing circuit and storing instructions for execution by the processing circuit for performing a method comprising:

receiving first data associated with a collaborative event, the first data comprising data indicative of a location of the collaborative event, data indicative of a start time of the collaborative event, and data indicative of respective roles of one or more participants in the collaborative event;

receiving second data from one or more sensors of a user device, the second data comprising data indicative of a current location of the user device and data indicative of network connectivity of the user device;

analyzing the first data and second data, wherein analyzing comprises:

determining, based at least in part on the location of the collaborative event, the start time of the collaborative event, and the current location of the user device, that an estimated arrival time of a user of the user device to the collaborative event is after the start time;

determining, based at least in part on the second data, a proximity of the user device to available networks, wherein the second data comprises network proximity data captured by a network antenna of the user device;

determining, interaction capabilities of devices present at the collaborative event;

determining, interaction capabilities of the user device, determining, based at least in part on the proximity of the user device to available networks, the interaction capabilities of the user device, and the interaction capabilities of devices present at the collaborative event, that the network connectivity of the user device can support a remote connection of the user device to at least one device present at the collaborative event; and determining, based at least in part on a comparison of the respective roles of the one or more participants in the collaborative event to an expected role of the user in the collaborative event and an assessment of historical data indication whether the user was physically present at prior collaborative events or remotely connected to the prior collaborative events, whether to generate a first recommendation that the user physically arrive at the location of the collaborative event after the start time or generate a second recommendation for the user device to connect remotely to the device present at the collaborative event at or prior to the start time;

generating an action recommendation based at least in part on the analyzed first data and the analyzed second data, wherein the action recommendation comprises the first recommendation or the second recommendation; and transmitting the action recommendation.

9. The computer program product of claim 8, wherein the action recommendation comprises the first recommendation and further comprises a route to the collaborative event.

10. The computer program product of claim 8, wherein the action recommendation comprises the second recommendation, the method further comprising:
   determining an available network in proximity to the user device;
   obtaining network credentials for the available network;
   determining, a location from which the available network is accessible, and
   sending an indication of the location and the cutwork credentials to the user device.

11. The computer program product of claim 8, wherein the action recommendation comprises:
   updating the collaborative event with a new date, a new time, or both; and
   transmitting an update notification to each meeting attendee associated with the collaborative event.

12. The computer program product of claim 8, wherein analyzing the first data and second data further comprises:
   generating weighted factors using the first data; and
   analyzing the second data using the weighted factors.

13. The computer program product of claim 8, the method further comprising:
   receiving a user profile for each attendee associated with the collaborative event;
   analyzing the user profile for each attendee; and
   generating the action recommendation based on the analyzed first data, the analyzed second data, and the analyzed user profile for each attendee.

14. The computer program product of claim 8, wherein the action recommendation is a first action recommendation, the method further comprising:
   receiving updated second data from the one or more sensors of the user device;
   analyzing the first data and updated second data;
   generating a second action recommendation based on the analyzed first data and the analyzed updated second data; and
   transmitting the second action recommendation.

15. A system, comprising:
   a processor in communication with one or more types of memory, the processor configured to:
      receive first data associated with a collaborative event, the first data comprising data indicative of a location of the collaborative event, data indicative of a start time of the collaborative event, and data indicative of respective roles of one or more participants in the collaborative event;
      receive second data from one or more sensors of a user device, the second data comprising data indicative of a current location of the user device and data indicative of network connectivity of the user device;
      analyze the first data and second data, wherein analyzing comprises:
         determining, based at least in part on the location of the collaborative event, the start time of the collaborative event, and the current location of the user device, that an estimated arrival time of a user of the user device to the collaborative event is after the start time;
         determining, based at least in part on the second data, a proximity of the user device to available networks, wherein the second data comprises network proximity data captured by a network antenna of the user device;
         determining interaction capabilities of devices present at the collaborative event;
         determining interaction capabilities of the user device;
         determining, based at least in part on the proximity of the user device to available networks, the interaction capabilities of the user device, and the interaction capabilities of devices present at the collaborative event, that the network connectivity of the user device can support a remote connection of the user device to at least one device present at the collaborative event; and
         determining, based at least in part on a comparison of the respective roles of the one or more participants in the collaborative event to an expected role of the user in the collaborative event and an assessment of historical data indication whether the user was physically present at prior collaborative events or remotely connected to the prior collaborative events, whether to generate a first recommendation that the user physically arrive at the location of the collaborative event after the start time or generate a second recommendation for the user device to connect remotely to the device present at the collaborative event at or prior to the start time;
      generate an action recommendation based at least in part on the analyzed first data and the analyzed second data, wherein the action recommendation comprises the first recommendation or the second recommendation; and
      transmit the action recommendation.

16. The system of claim 15, wherein the action recommendation comprises the first recommendation and further comprises a route to the collaborative event.

17. The system of claim 15, wherein the action recommendation comprises the second recommendation, the processor further configured to:
   determine an available network in proximity to the user device;
   obtain network credentials for the available network;
   determine a location from which the available network is accessible; and
   send an indication of the location and the network credentials to the user device.

18. The system of claim 15, wherein the action recommendation comprises:
   updating the collaborative event with a new date, a new time, or both; and
   transmitting an update notification to each meeting attendee associated with the collaborative event.

19. The system of claim 15, wherein to analyze the first data and second data, the processor is further configured to:
   generate weighted factors using the first data; and
   analyze the second data using the weighted factors.

20. The system of claim 15, wherein the processor is further configured to:
   receive a user profile for each attendee associated with the collaborative event;
   analyze the user profile for each attendee; and
   generate the action recommendation based on the analyzed first data, the analyzed second data, and the analyzed user profile for each attendee.

* * * * *